No. 703,893. Patented July 1, 1902.
F. BRÜCK.
AUTOMATIC SHUTTER OPERATING DEVICE FOR PHOTOGRAPHIC CAMERAS.
(Application filed Mar. 6, 1902.)

(No Model.) 2 Sheets—Sheet 1.

Witnesses:
Inventor
Friedrich Brück
By
James L. Norris
Atty

THE NORRIS PETERS CO., PHOTO-LITHO., WASHINGTON, D. C.

No. 703,893. Patented July 1, 1902.
F. BRÜCK.
AUTOMATIC SHUTTER OPERATING DEVICE FOR PHOTOGRAPHIC CAMERAS.
(Application filed Mar. 6, 1902.)
(No Model.) 2 Sheets—Sheet 2.
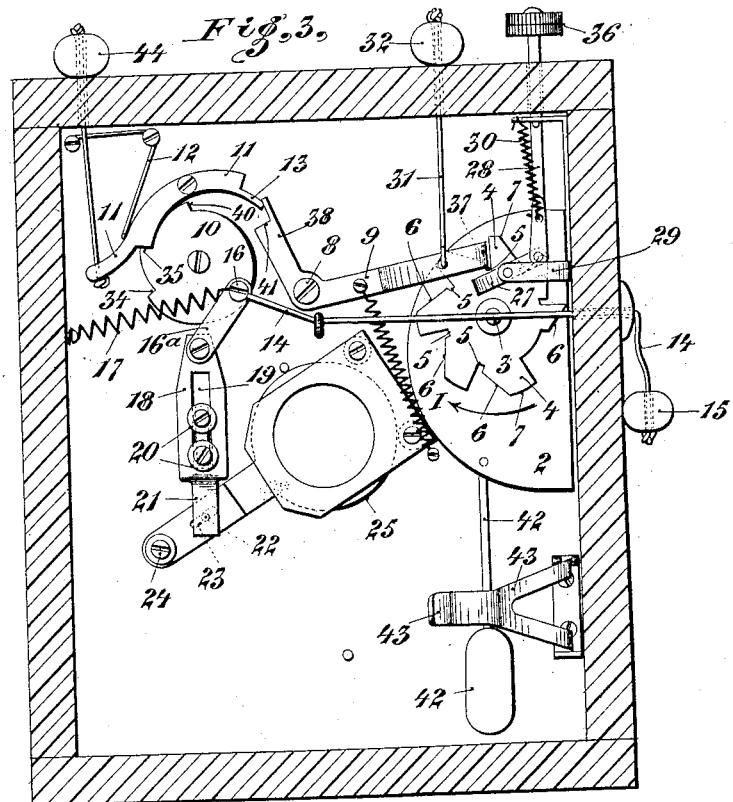
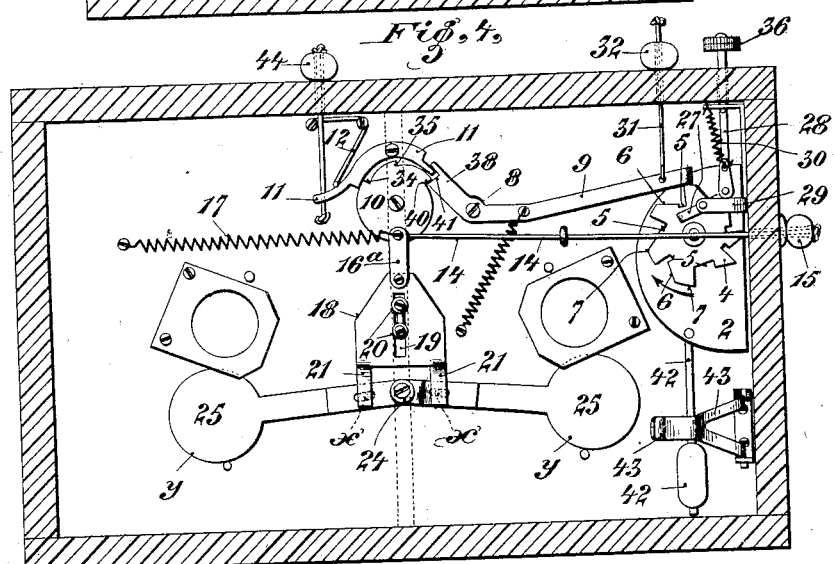
Witnesses:
Inventor
Friedrich Brück
By
James L. Norris
Atty

UNITED STATES PATENT OFFICE.

FRIEDRICH BRÜCK, OF RUHLA, GERMANY.

AUTOMATIC SHUTTER-OPERATING DEVICE FOR PHOTOGRAPHIC CAMERAS.

SPECIFICATION forming part of Letters Patent No. 703,893, dated July 1, 1902.

Application filed March 6, 1902. Serial No. 96,951. (No model.)

*To all whom it may concern:*

Be it known that I, FRIEDRICH BRÜCK, watchmaker, a subject of the Prince of Weimar, residing at Ruhla i. Th., in the dominion of the Prince of Weimar, German Empire, have invented certain new and useful Improvements in Automatic Shutter-Operating Devices for Photographic Cameras, of which the following is a specification.

My invention relates to an automatic shutter-operating device for photographic cameras, and has for its object to obviate certain objections inherent in similar devices as heretofore constructed.

Automatic shutter-operating devices of this kind designed for the purpose of enabling the photographer to take his own photo either with instantaneous or with time-exposure shutters have the objection that they are applicable only for definite shutter arrangements and that they have to be secured to the exterior of the camera, and thus exposed to damage, while, moreover, the high-speed spring-controlled operating mechanism, with its flier, produces vibration of the camera, and thus also undue interference with the exposure. Further, the ordinary automatic shutter-operating devices previously invented are expensive and require frequent repairing, chiefly because they are not permanently fixed to the apparatus and have in most cases to be carried separately in the pocket.

The improved device according to my invention avoids the aforementioned objections by being fixed in the interior of the photographic apparatus and also by reason of being controlled for any desired exposure by a spring-operated mechanism with pendulum in such a manner as to allow the self-photographer time to first adjust his shutter mechanism to the required operative position and then to take his proper position without undue hurry, then to operate the shutter for exposure and after the required time to disengage the shutter and automatically stop the mechanism.

The accompanying two sheets of drawings illustrate the improved automatic shutter-operating device connected to a camera.

Figure 1:
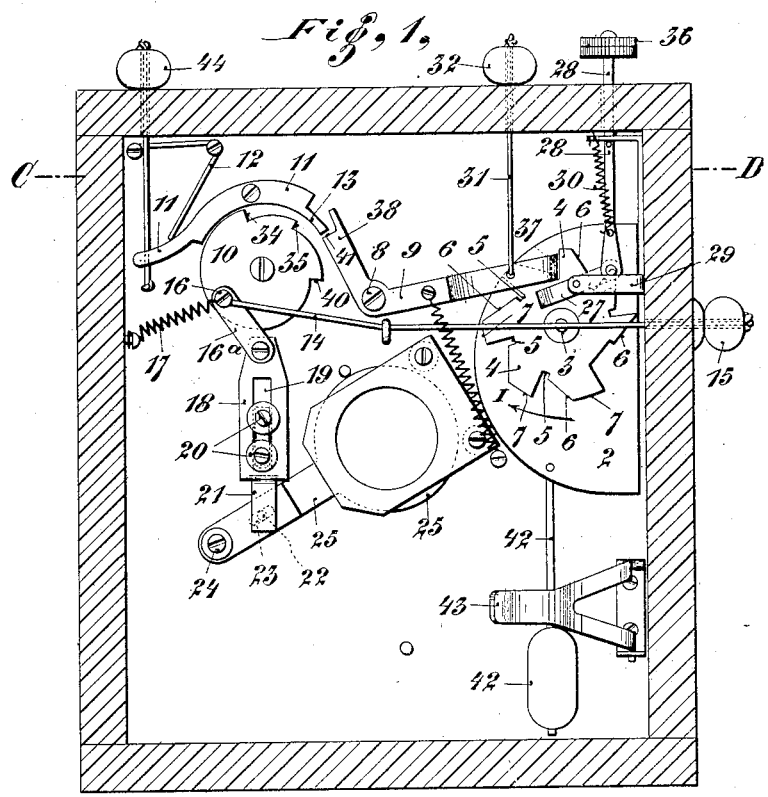
Figure 2:
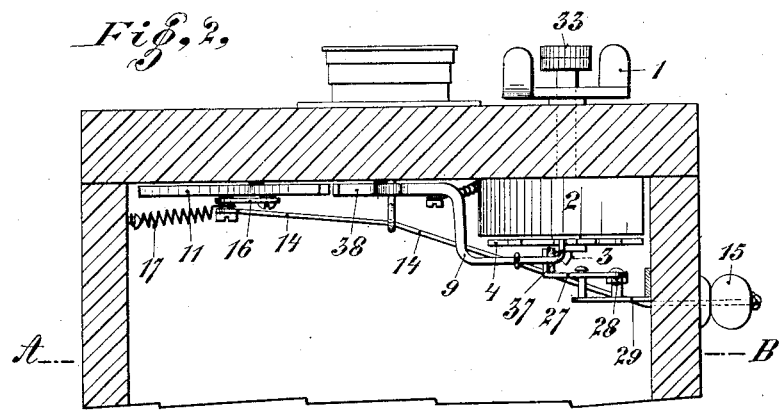

Figure 1 is a vertical section taken on the line A B, Fig. 2, and showing the mechanism in its inoperative position. Fig. 2 is a transverse section taken on the line C D, Fig. 1. Fig. 3 shows the operating mechanism at the moment when ready for operating the shutter. Fig. 4 shows the same mechanism applied to a stereoscopic camera.

In the casing of the camera is provided a spring-box 2, with spring adapted to be wound up by a winged nut 1. Upon an arbor 3 of the spring mechanism 2 is fixed a wheel 4, formed with notches 5 and inclined contact-surfaces 6, in conjunction with unequally long peripheral surfaces 7. The notches 5 serve to engage a flexible two-armed lever 9, fulcrumed at 8. Above a ratchet-wheel 10 is fulcrumed a two-armed pawl 11, which is constantly pressed against the ratchet-wheel by means of a spring 12, so as to engage with the ratchet-teeth of the wheel 10, the end 13 of said pawl being acted upon by the lever 9 when required to disengage the other end of said pawl. The engagement of the ratchet-wheel 10 with the locking-pawl 11 is effected by pulling the knob 15 of a rod 14, secured to a crank-pin 16, fixed in the ratchet-wheel 10, a spring 17 being connected to said crank-pin to return the ratchet-wheel to its position of rest. The crank-pin 16 is fitted with a link 16$^a$, secured to a sliding piece 18, guided by means of a slot 19, engaging screws 20. At the lower end of said sliding piece 18 is provided an upturned arm 21, fitted with a pin 22 in engagement with a slot 23 of the shutter 25, pivoted at 24. The shutter 25 can thus be opened and closed by the action of the pin 22. For lifting the lever 9 out of the notches 5 of the star-wheel 4 a lever 27, pivoted to the carrier 29, is in connection at top with an operating-rod 28, passing through and guided in the casing of the camera. A spring 30 acts to return the lever 27 to its idle position.

The operation and action of the device are as follows: After first winding up the clockwork 2 by means of the fly-nut 1 the rod 31, with knob 32, is pulled outward, so as to disengage the two-armed lever 9 from the corresponding notch 5 of the wheel 4. Thereupon the screw 33 is turned in the proper direction so as to revolve the wheel 4 into the required position for the desired time exposure, and the lever 9 is permitted to reëngage in a notch 5. Knob 15 is then pulled out until the pawl 11 engages in the first tooth 34 of the ratchet-wheel 10, thereby moving the crank-pin 16 and link 16ª in line with the sliding piece 18, Fig. 4, and by thus pushing and moving the latter down the shutter 25 is also swung down, so as to clear the lens. When the object has been properly placed, a further pull upon the knob 15 causes the pawl 11 to engage with the second tooth 35 of the ratchet-wheel 10, which latter again displaces the crank-pin 16, and thereby lifts the sliding piece 18, and so causes the shutter to close the lens. The closing-shutter is thus under tension, (see Fig. 3,) and the picture can now be taken by pressing upon the knob 36. Thereby the arm 27 lifts the lever 9 out of the notch 5, which permits the wheel 4 to be revolved by the spring mechanism 2 in the direction indicated by the arrow I. The self-photographer then takes up his position, for which he has time, till the lever 9, with its lateral end 37, reaches the highest point upon the inclined surface 6. When it has passed upon the peripheral surface 7, set for the proper time exposure, (the longer the peripheral surface the longer the time exposure,) the lever 9 has meanwhile by its arm 38 effected the disengagement of the locking-pawl 11. The ratchet-wheel 10, returned by the spring 17, then engages with its third tooth 40 in the notch 41 of the arm 38, while at the same time the shutter opens the lens, Fig. 4, and is kept open till the end 37 of the lever 9 slides down into the notch 5. The ratchet-wheel 10 is then by the spring 17 returned to its orignal position, Fig. 1, and at the same time allows the shutter to close the lens.

When the apparatus is not in use, the pendulum 42 of the driving mechanism 2 is retained by a spring-clamp or grippers 43.

The apparatus can also be used without the automatic releasing device similar to an ordinary photographic apparatus by pulling the knob 15, so as to place the shutter under tension, and then for instantaneous exposures merely pull the pawl 11 by means of the knob 44, or for time exposure the operator merely pulls the knob 32, retaining it during the time required to make the exposure.

In stereoscopic apparatus the sliding piece 18 has two upturned arms 21, which by means of pins $x$ $x$, fixed thereto, actuate the corresponding shutters in the previously-described manner, the arrangement being shown at Fig. 4.

Having now particularly described and ascertained the nature of my said invention and in what manner the same is to be performed, I declare that what I claim is—

1. In an automatic shutter-operating device for photographic cameras, a wheel provided with inclined contacting surfaces and peripheral surfaces of suitable width, mechanism for rotating said wheel, a lever suitably engaging said wheel, a ratchet-wheel connected with the shutter of the camera, a pawl adapted to engage said ratchet-wheel and lever, means for operating said lever causing thereby the operation of the pawl, and means for positioning said ratchet-wheel so that when released by said pawl its movement will cause the automatic operation of the shutter, substantially as herein shown and described.

2. In an automatic shutter-operating device for photographic cameras, a wheel provided with notches, inclined contact-surfaces and peripheral surfaces of suitable width, mechanism for rotating the said wheel, a spring return-lever suitably engaging with the said wheel during the operation thereof, a three-toothed ratchet-wheel, a pawl adapted to engage in the teeth of said ratchet-wheel and operated by said lever, means for disengaging said lever from said notched wheel causing thereby the disengagement of the pawl with the ratchet-wheel to permit of the operation of the latter, means for connecting said ratchet-wheel to the shutter of the camera, and means for positioning the ratchet-wheel so that when released by said pawl its movement will cause the operation of the shutter.

3. In an automatic shutter-operating device for photographic cameras, a wheel provided with notches, inclined contact-surfaces and peripheral surfaces of suitable width, mechanism for suitably rotating said wheel, a spring-actuated mechanism connected with and adapted to operate the shutter of the camera, and mechanism engaging with the said notched wheel and with the shutter-operating mechanism for operating the latter when the notched wheel is operated.

4. In an automatic shutter-operating device for photographic cameras, a wheel provided with notches, inclined contact-surfaces and peripheral surfaces of suitable width, a spring-actuated mechanism connected with the shutter of the camera for operating it, and means engaging the contact and peripheral surfaces and in the notches of the said wheel for causing the operation of the said spring-actuated mechanism.

In testimony whereof I have hereunto set my hand in presence of two subscribing witnesses.

FRIEDR. BRÜCK.

Witnesses:
WILHELM BINDEWALD,
MAX MEYER.